(12) United States Patent
Storey

(10) Patent No.: US 10,888,054 B2
(45) Date of Patent: Jan. 12, 2021

(54) VERTICAL HYDROPONIC TOWER ARRAY FIXTURE SYSTEM

(71) Applicant: University of Wyoming, Laramie, WY (US)

(72) Inventor: Nathaniel R. Storey, Laramie, WY (US)

(73) Assignee: University of Wyoming, Laramie, WY (US)

( * ) Notice: Subject to any disclaimer, the term of this patent is extended or adjusted under 35 U.S.C. 154(b) by 285 days.

(21) Appl. No.: 15/522,069

(22) PCT Filed: Nov. 11, 2015

(86) PCT No.: PCT/US2015/060085
§ 371 (c)(1),
(2) Date: Apr. 26, 2017

(87) PCT Pub. No.: WO2016/081234
PCT Pub. Date: May 26, 2016

(65) Prior Publication Data
US 2017/0332568 A1    Nov. 23, 2017

Related U.S. Application Data

(60) Provisional application No. 62/081,733, filed on Nov. 19, 2014.

(51) Int. Cl.
*A01G 31/02*    (2006.01)
*A01G 9/04*     (2006.01)
(Continued)

(52) U.S. Cl.
CPC ............ *A01G 31/02* (2013.01); *A01G 9/047* (2013.01); *A01G 18/64* (2018.02); *A01G 24/00* (2018.02);
(Continued)

(58) Field of Classification Search
CPC ........ A01G 31/00; A01G 31/02; A01G 31/06; A01G 2031/006; A01G 9/047; A01G 27/04
See application file for complete search history.

(56) References Cited

U.S. PATENT DOCUMENTS 3,018,586 A    1/1962 Farley
4,070,793 A    1/1978 Dillon
(Continued)

FOREIGN PATENT DOCUMENTS

CA    2284389    4/2001
EP    2030503    3/2009
(Continued)

OTHER PUBLICATIONS

International Search Report, PCT/US15/30170, dated Aug. 12, 2015.
(Continued)

*Primary Examiner* — Thanh Pham
(74) *Attorney, Agent, or Firm* — Weatherly IP Solutions, LLC; James Weatherly

(57) ABSTRACT

A modular hydroponic tower array fixture system for the growth of organisms such as plants and fungi on arrays of hydroponic towers, allowing for the insertion and removal of individual towers from the array, is provided. Methods for the production of organisms such as plants and fungi using a modular hydroponic tower array fixture system are also provided herein.

25 Claims, 8 Drawing Sheets

(51) Int. Cl.
*A01G 24/00* (2018.01)
*A01G 18/64* (2018.01)
*A01G 25/00* (2006.01)
*A01G 27/04* (2006.01)
*A01G 18/00* (2018.01)
*A01G 25/02* (2006.01)

(52) U.S. Cl.
CPC ............. *A01G 25/00* (2013.01); *A01G 27/04* (2013.01); *A01G 18/00* (2018.02); *A01G 25/023* (2013.01); *Y02P 60/21* (2015.11)

(56) References Cited

U.S. PATENT DOCUMENTS

| | | | |
|---|---|---|---|
| 4,454,684 A | 6/1984 | O'Hare | |
| 4,476,651 A | 10/1984 | Drury | |
| 4,932,158 A | 6/1990 | Roberts | |
| 5,363,594 A | 11/1994 | Davis | |
| 5,588,253 A * | 12/1996 | Boodley | A01G 5/04 428/3 |
| 6,840,007 B2 | 1/2005 | Leduc et al. | |
| 6,951,076 B2 | 10/2005 | Winsbury | |
| 7,188,451 B2 * | 3/2007 | Marchildon | A01G 31/047 47/59 R |
| 8,122,642 B1 | 2/2012 | Huberman et al. | |
| 8,327,582 B2 | 12/2012 | Storey | |
| 8,365,466 B1 | 2/2013 | Storey | |
| 8,966,815 B1 | 3/2015 | Smiles | |
| 9,491,915 B2 | 11/2016 | Storey | |
| D785,497 S | 5/2017 | Storey | |
| D796,378 S | 9/2017 | Storey | |
| D821,915 S | 7/2018 | Storey | |
| D826,769 S | 8/2018 | Storey | |
| D832,738 S | 11/2018 | Storey | |
| 2001/0047617 A1 | 12/2001 | Blossom | |
| 2003/0101645 A1 | 6/2003 | Cole et al. | |
| 2004/0020114 A1 * | 2/2004 | Boehmer | A01C 1/044 47/57.6 |
| 2005/0055878 A1 | 3/2005 | Dumont | |
| 2006/0156624 A1 | 7/2006 | Roy et al. | |
| 2006/0236604 A1 * | 10/2006 | Hesse | A01C 1/06 47/57.6 |
| 2009/0293350 A1 | 12/2009 | Kania et al. | |
| 2011/0016782 A1 * | 1/2011 | Harder | A01G 9/02 47/66.1 |
| 2011/0016784 A1 | 1/2011 | Taber | |
| 2012/0000128 A1 * | 1/2012 | Rochefort | A01G 31/02 47/62 R |
| 2013/0219788 A1 * | 8/2013 | VanLente | A01G 9/022 47/62 A |
| 2014/0020292 A1 | 1/2014 | McNamara et al. | |
| 2014/0259904 A1 | 9/2014 | Collard | |
| 2015/0264868 A1 | 9/2015 | Smiles | |
| 2015/0342127 A1 * | 12/2015 | Gallant | A01G 9/02 47/20.1 |

FOREIGN PATENT DOCUMENTS

| | | |
|---|---|---|
| JP | 0614665 | 1/1994 |
| JP | 56154961 | 10/2014 |
| JP | 2014212701 | 11/2014 |
| WO | 2005025299 A1 | 3/2005 |
| WO | 20150175415 | 11/2015 |

OTHER PUBLICATIONS

Horton, Robin, "Vertical Farming on Rise for Urban Food Supply", Urban Gardens, Jul. 9, 2010, 5 pages.

International Search Report, PCT/US15/60085, dated Jan. 28, 2016.

Downing, Lois, "Planning and Building Green Walls," https://blog.brightagrotech.com/planning-and-building-green-walls/, Aug. 20, 2013, 10 pages.

Michael, Chris, "What is a Living Green Wall?," https://blog.brightagrotech.com/what-is-a-living-green-wall/, Aug. 28, 2014, 9 pages.

Michael, Chris, "ZipGrow Living Green Walls at ASLA 2014," https://blog.brightagrotech.com/zipgrow-living-green-walls-asla-2014/, Nov. 20, 2014, 9 pages.

Storey, Amy, "The Many Benefits of Living Walls," https://blog.brightagrotech.com/the-many-benetits-of-living-walls/ , Jun. 12, 2015, 13 pages.

Storey, Amy, "The Evolution of the ZipGrow Farm Wall Design," https://blog.brightagrotech.com/the-evolution-of-the-zipgrow-farm-wall-design/, Jul. 23, 2015, 10 pages.

Storey, Amy, "What Happens When Restaurants Become Urban Farms?," https://blog.brightagrotech.com/what-happens-when-restaurants-become-urban-farms/, Sep. 30, 2015, 6 pages.

Storey, Nate, "How Do Green Walls Work?," Bright Agrotech, https://youtu.be/y_DXn4YdkBQ, Aug. 15, 2013, 5:22 minutes, screen shot 1 page.

Storey, Nate, "World's First Aquaponic Living Green Wall," Bright Agrotech, https://youtu.be/zO_GeRDU2x0, Aug. 13, 2013, 5:40 minutes, screen shot 1 page.

Bright Agrotech, "How Do Living Green Walls Work?," Bright Agrotech, https://youtu.be/LdBDtP1mcxU, Sep. 19, 2014, 2:49 minutes, screen shot 1 page.

Bright Agrotech, "September Green Wall Update," Bright Agrotech, https://youtu.be/VmVhoBAd6KU, Sep. 30, 2014, 1:22 minutes, screen shot 1 page.

Bright Agrotech, "Laramie Green Wall Update Snow Edition (Nov. 3, 2014)," Bright Agrotech, https://youtu.be/zvjTgSVX5s4, Nov. 3, 2014, 1:10 minutes, screen shot 1 page.

Bright Agrotech, "Green Wall Update (Frozen in Time)—Nov. 10, 2014," Bright Agrotech, https://youtu.be/kraa_d3ddRg, Nov. 11, 2014, 2:07 minutes, screen shot 1 page.

Smith, Damon, "Assembling a ZipGrow Farm Wall," Upstart University, https://www.slideshare.net/BrightAgrotech/assembling-a-zipgrow-farm-wall, Sep. 21, 2015, 40 slides.

"Assembling a Vertical Hydroponics System," Bright Agrotech, Upstart University, https://www.slideshare.net/BrightAgrotech/greenwall-assembly-instructions-v1, Jun. 3, 2014, 26 slides.

Peters, Adele, "These Vertical Farms Turn Unused City Wall Space Into Gardens That Grow Your Lunch," Fast Company, https://www.fastcompany.com/3052538/these-vertical-farms-turn-unused-city-wall-space-into-gardens-that-grow-your-lunch, Oct. 23, 2015, 6 pages.

https://brightagrotech.com/vertical-gardening/, Jun. 20, 2014. screen shot, 5 pages.

https://brightagrotech.com/farm-walls-grow-hyper-local-food-for-restaurants-all-year/, Nov. 3, 2015, screen shot, 1 page.

https://brightagrotech.com/vertical-farm-at-the-2015-worlds-fair/ Mar. 6, 2015, screen shot, 18 pages.

Farm Wall Buyer's Guide, 2017, 8 pages.

Zipgrow Farm Wall Manual, 2017, 14 pages.

\* cited by examiner

VERTICAL HYDROPONIC TOWER ARRAY FIXTURE SYSTEM

CROSS REFERENCE TO RELATED APPLICATIONS

This application claims the benefit of and priority to PCT Application No. PCT/US2015/060085, filed Nov. 11, 2015, which claims priority to U.S. Provisional Application No. 62/081,733 filed Nov. 19, 2014, the entire contents of both applications are incorporated herein by reference for all purposes.

BACKGROUND

Traditional hydroponics has focused primarily on horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance. In addition, conventional technology makes it difficult to allow in-store display of live, growing vegetables and is not conducive to "you-pick" vegetable and herb sales to customers.

SUMMARY

An embodiment of the present disclosure comprises a hydroponic tower array fixture system comprising: two or more hollow hydroponic towers, wherein each hollow hydroponic towers has a front, an open first end, and an open second end; a slot formed in the front of each hydroponic tower, the slot having a width equal to only a portion of a width of the front of the hydronic tower; and a media material insertable into each hollow hydroponic tower; an upper bracket, wherein at least two upper bracket openings are formed in the bottom surface of the upper bracket substantially corresponding to shape and width of the two or more hydroponic towers; and a lower bracket, wherein at least two lower bracket openings are formed in the bottom surface of the lower bracket substantially corresponding to shape and width of the two or more hydroponic towers; wherein the first end of at least one of the two or more hollow hydroponic towers is inserted into one of the at least two upper bracket openings of the upper bracket; and wherein the second end of the hollow hydroponic tower is inserted into one of the at least two lower bracket openings of the lower bracket.

Another embodiment may comprise a method for producing organisms on a hydroponic tower array fixture system, the method comprising: providing two or more hollow hydroponic towers, wherein said two or more hollow hydroponic towers have a front surface, an open first end, and an open second end; providing a slot formed in the front surface of each hydroponic tower; providing a media material; inserting said media material into each hollow hydroponic tower; providing an upper bracket, wherein at least two upper bracket openings are formed in the bottom surface of the upper bracket substantially corresponding to shape and width of the two or more hydroponic towers; and providing a lower bracket, wherein at least two lower bracket openings are formed in the bottom surface of the lower bracket substantially corresponding to shape and width of the two or more hydroponic towers; inserting the first end of at least one of the two or more hollow hydroponic towers into one of the at least two upper bracket openings of the upper bracket; and inserting the second end of the hollow hydroponic tower into one of the at least two lower bracket openings of the lower bracket; inserting one or more organisms into the medial material through the slot formed in the front surface of each hydroponic tower; and growing one or more organisms on said media material.

The following embodiments and aspects thereof are described and illustrated in conjunction with systems, tools and methods, which are meant to be exemplary and illustrative, not limiting in scope.

BRIEF DESCRIPTION OF THE FIGURES

The accompanying figures, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Embodiments of the present disclosure include various apparatus, systems and methods for the germination, growth and/or harvesting of organisms, including but not limited to, various forms of plants (including but not limited to pteridophytes, gymnosperms and angiosperms, such as annual and perennial ornamental plants, vegetables, including leafy greens, brassicas, tomatoes) and fungi (including but not limited to basidiomycetes and ascomycetes) in hydroponic towers modularly coupled in an array to allow for individual hydroponic towers to be removed from the array as necessary. The apparatus and system allows for an array of two or more hydroponic towers to be attached to vertical surfaces, including, but not limited to, internal and external walls of structures such as houses, offices, warehouses and outbuildings.

The system described herein allows for hydroponic towers to be placed in the array and easily removed by the user, making this a user friendly means of organizing and attaching towers to structures while simultaneously irrigating and collecting effluent from the towers using integrated irrigation and collection systems.

Figure 1:
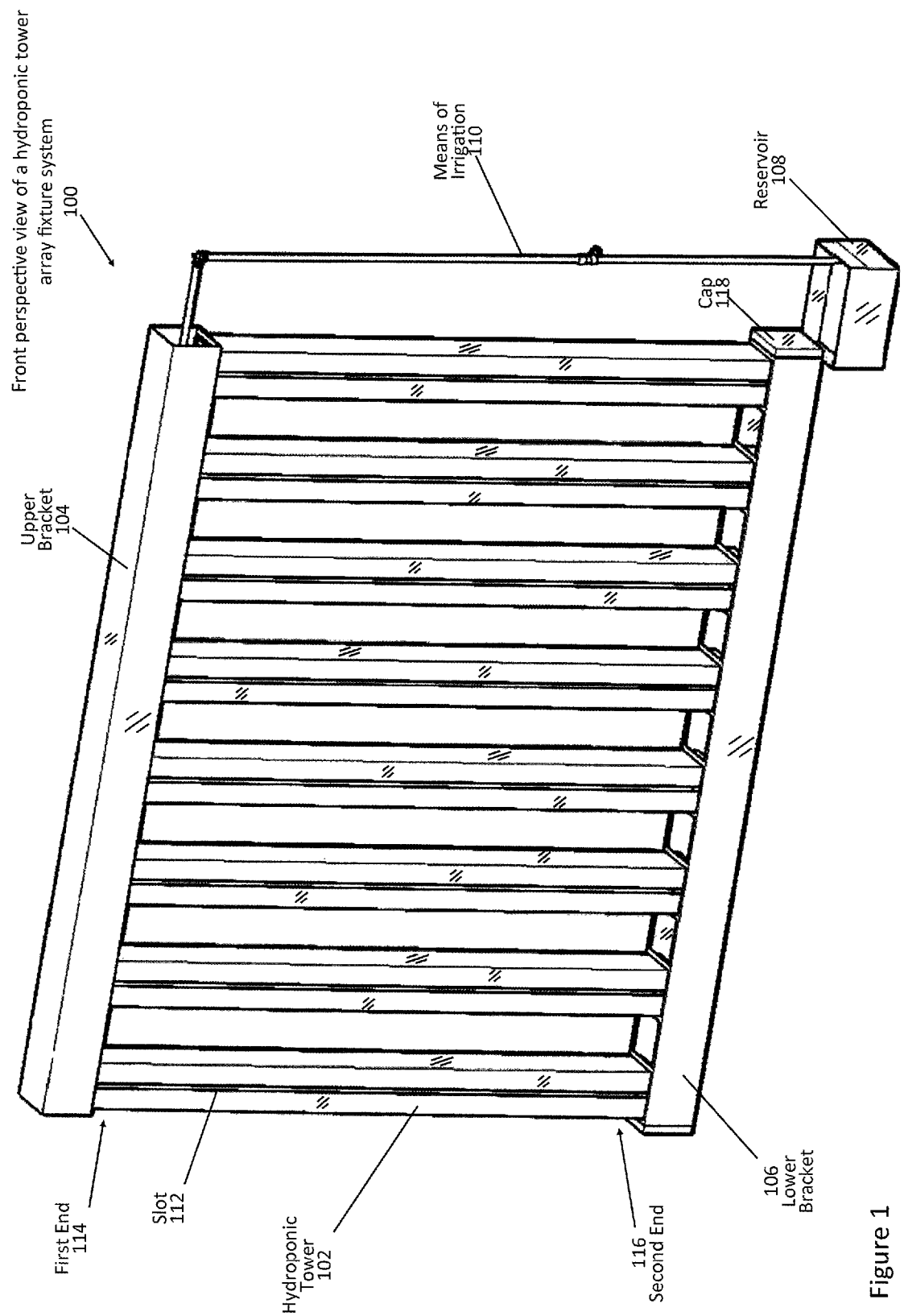
FIG. 1 is a perspective view illustrating an example of the front of a hydroponic tower array fixture system.

FIG. 1 provides a front perspective view of an example modular hydroponic tower array system of the present disclosure 100. As shown in FIG. 1, the modular hydroponic tower array system comprises two or more hydroponic towers 102, at least one upper bracket 104; at least one lower bracket 106; a reservoir 108 and a means of irrigation 110 to transport water and nutrients from the reservoir 108 to the top of the two of more hydroponic towers 102.

As will be discussed and shown in further detail in FIG. 2, each hydroponic tower 102 is a hollow, elongated structure with a slot 112 formed lengthwise from the first end 114 of the hydroponic tower 102 to the second end 116 the hydroponic tower 102 along the front of the tower 102. Each tower 102 may be constructed of metal such as steel or aluminum, or other materials such as but not limited wood, synthetic polymers such as nylon, plastics, such as high density polyethylene 'HDPE' or concrete. In the example system 100 shown in FIG. 1, eight (8) hydroponic towers 102 are illustrated but any number of two or more hydroponic towers 102 can be used in the system. Therefore, while this descriptive example has eight hydroponic towers 102, it should be understood that this description is applicable to any such system with other numbers of hydroponic towers, as will be understood by one skilled in the art, once they understand the principles of this system.

As further shown in FIG. 1, an embodiment of the modular hydroponic tower array 100 consists of an upper bracket 104 and lower bracket 106. As will be discussed in further detail in relation to FIG. 4, the upper bracket 104 is a hollow, elongated structure and comprises openings (not shown in FIG. 1) cut along lower surface of the upper bracket 104, cut slightly larger than the cross sectional dimensions and shape of the corresponding hydroponic tower 102, allowing the upper bracket 104 to slip over the top of the hydroponic tower 102.

As will be discussed in further detail in FIG. 3a, the lower bracket 106 also is a hollow, elongated structure and comprises openings, cut along upper surface of the lower bracket 106, oppositely disposed to the openings of the upper bracket 104 when the two brackets are aligned. In an embodiment, each end of the lower bracket 106 may be fitted with a cap 118, where a drain fitting (not shown in FIG. 1) is operably coupled to the cap 118 to allow excess effluent, such as water and/or nutrients, to drain away from the lower bracket 106. The lower bracket 106 functions as a gutter system when a drain fitting is installed, allowing effluent such as water and nutrient solutions to be collected and drained away.

As shown in FIG. 1, a reservoir 108 is provided to capture and store excess water or nutrients that runs through the hydroponic towers 102 and through the lower bracket 106. A means of irrigation 110, such as a pump operably coupled to a pipe, hose or other conduit which is capable of delivering water and nutrient solutions (such as but not limited to solutions containing nitrogen, phosphorus, potassium, iron, magnesium and zinc), is also shown in FIG. 1 The means of irrigation 110 allows water and/or nutrient solutions to be transported from the reservoir 108 to the first end 114 of the hydroponic towers 102, by running the means of irrigation 110, such as a pipe along the top of the hydroponic towers 102. The water or nutrient solution may be emitted from the means of irrigation 110 to the first end of the hydroponic towers 102 by a variety of emitters, including but not limited to drip emitters, sprinklers and micro-spray emitters.

In an embodiment, a pump moves water and/or nutrient solutions through the means of irrigation 110 from the reservoir 108 to the top or first end of the hydroponic towers 102, distributing a nutrient solution into media material (not shown in FIG. 1) inserted in the grow chamber. The water and/or nutrient solution is allowed to drip down through the media and the roots of the plants or fungi growing in the media. Some of the nutrient solution trickles down the walls of the hydroponic towers 102 and is captured by roots or hyphae in contact with the walls of the towers 102. Excess nutrient solution drains to the bottom of the hollow grow chamber of the tower 102 where it is drained into the lower bracket 106 and subsequently drains into the reservoir 108.

As will be discussed in FIG. 5, the means of irrigation 110 can be easily hidden in the upper bracket 104 by attaching irrigation lines to the top of the upper bracket 104, with emitters allowing water to drip down onto the tops of the inserted towers 102.

In another embodiment, water or excess solution in the reservoir 108 may be pumped to a storage tank (not shown in FIG. 1). The storage tank may hold/store the water and nutrient solutions for future use in the hydroponic tower array system 100.

Figure 2:
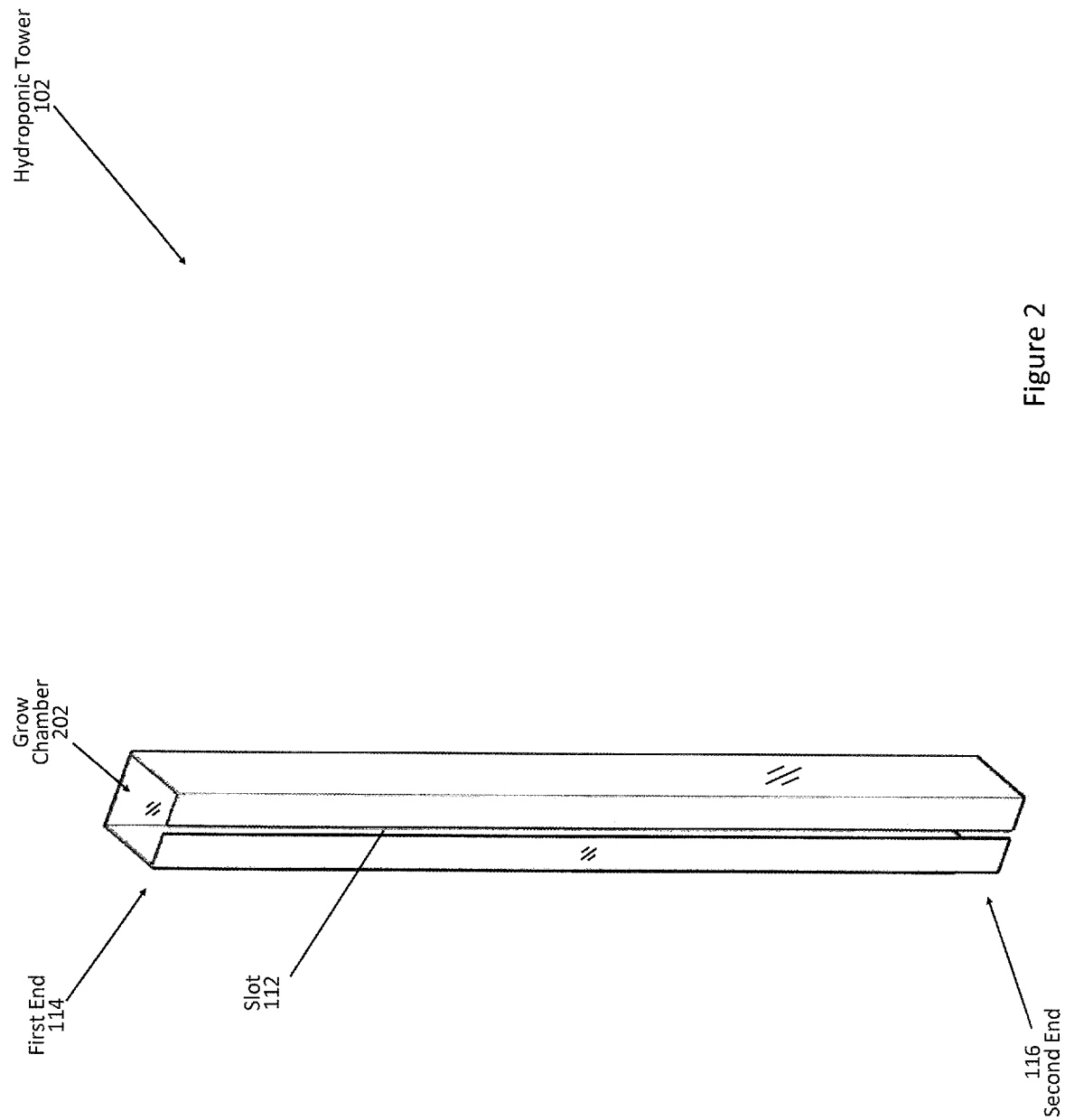
FIG. 2 is a close-up view illustrating an example of a hydroponic tower of the modular hydroponic tower array fixture system.

FIG. 2 provides a close-up view of a single hydroponic tower 102. As shown in FIG. 2, the hydroponic tower 102 is comprised of a front, with an open top portion and an open bottom portion. The hollow shape of the hydroponic tower 102 creates a grow chamber 202 in the hollow cavity of the hydroponic tower 102 where media material is inserted to provide a stable surface/platform on which an organism such as a plant or mushroom is able to establish roots or rhizomes and grow. While the shape of the elongated hydroponic towers 102 shown in FIG. 1 and FIG. 2 are substantially square or rectangular, as will be understood by one skilled in the art, a variety of shapes may be used to create the hydroponic shown and growth chambers described herein, including but not limited to substantially square, rectangular, round, oval, octagon, pentagon and triangular.

As further shown in FIG. 2, the hydroponic tower 102 has a slot 112 formed lengthwise along the front of the tower 102. The slot 112 also allows for the easy insertion of organisms such as plants and fungi into the media along the length of the structure and to grow out of media that is inserted into the growth chamber 202.

The media material of the present disclosure maybe be a single piece of media composed of a variety of materials including plastic, such as a polyester matrix material cut to a diameter that allows for easy insertion of the material into the grow chamber 202 of each hydroponic tower 102. In another embodiment, the media material may be coated in a silicone binder. In one embodiment, the single piece of media material may be cut into strips the width of the diameter of the grow chamber 202. The individual strips of media material may then be folded and pulled into this grow chamber 202 at the top of the grow chamber 202 of each hydroponic tower 102, with seedlings or fungi sandwiched in the fold between the two halves of the media material and corresponding to the location of the slot 112 running the length of the face of the hydroponic towers 102. As the media is pulled into the grow chamber 202, more seedlings are added, and as the media enters the grow chamber 202, the shoots of the seedlings extend out horizontally and travel down this slot 112. Multiple media inserts may be added to the grow chamber 202, until the media encompasses the entire length of the grow chamber 202.

A variety of media material may be used with the system of the present disclosure. Examples of media that may be used in the system of the present disclosure may include but is not limited to, a fibrous, non-woven matrix media material, granular materials, Styrofoam, polyurethane foam, plastic mesh, rock wool, coconut fiber, vermiculite, as well as organic soil such as potting soil.

In an embodiment of the present disclosure, the media material of the present disclosure may be altered in several ways to serve a diverse range of functions. The media may be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the grow chamber 202. This alteration allows compost based hydroponic growth using regular irrigation water, with plant or fungal nutrients supplied by the compost or other additive. Tops, sides, and corners of the media material can also be cut, rounded, or cut at an angle to reduce biosolids accumulation, algal growth, or to enhance water distribution through the media, depending on application. Multiple inserts can also be used in the grow chambers 202 allowing multiple age groups of plants and fungi to incorporate into each grow chamber 202. Worms are also commonly integrated into the grow chambers and the media is designed to have the correct mesh size to accommodate their movement through the media, although media with a smaller or larger mesh size may be used depending on application.

Plants, seedlings or fungal tissue are placed between the two halves of media in each grow chamber 202 of the system, with the upper portions of the plant or organism protruding through the slot 112 of each hydroponic tower 102.

In a further embodiment, the media material is folded in half, a pulling hook with a flat hook attached to a handle allows the media inserts to be pulled into and out of the grow chamber 202 by means of the slot 112, with the pulling hook handle extending from the slot 112 in the grow chamber 202 of each hydroponic tower 102. In a further embodiment, the hook can also be attached to a pneumatic or hydraulic device that allows automated "pulling" of the media inserts.

Figure 3A:
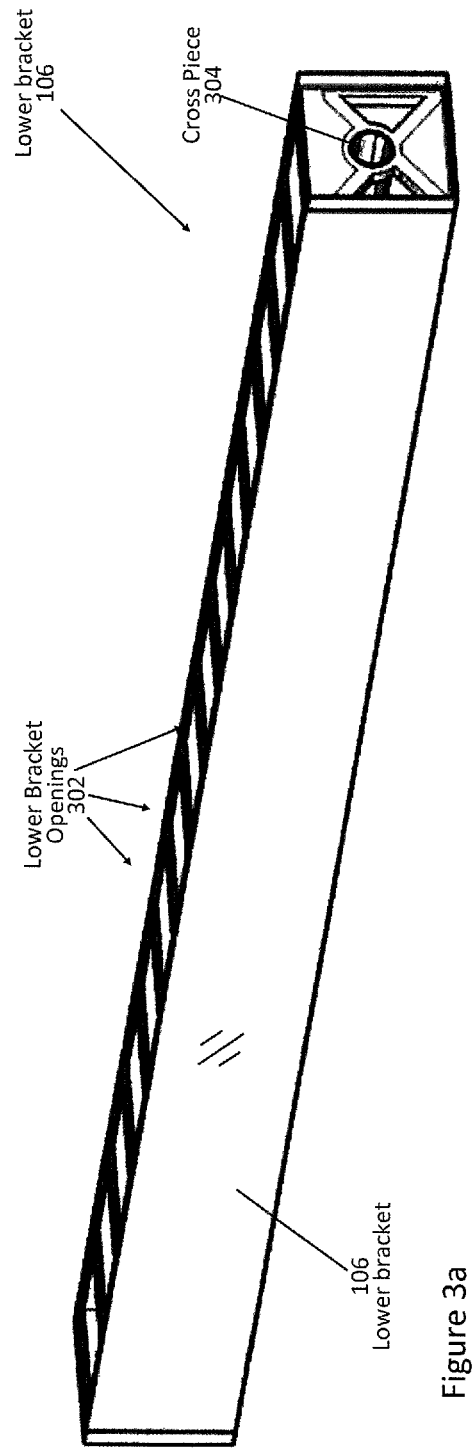
FIG. 3a is a perspective view illustrating an example of the lower bracket of the modular hydroponic tower array fixture system.

FIG. 3a provides a perspective view of the lower bracket 106 of the hydroponic array system. As shown in FIG. 3a, the lower bracket 106 is an elongated hollow structure with lower bracket openings 302 cut along the upper surface of the lower bracket 106, of the same shape and slightly larger than the cross section dimensions of the hydroponic tower 102 where the shape may include but is not limited to, substantially square, rectangular, round, oval, octagon, pentagon and triangular. In embodiment of the present disclosure, inside the lower bracket 106 is placed a cross piece 304 that runs down the length of the lower bracket 106.

Figure 3B:
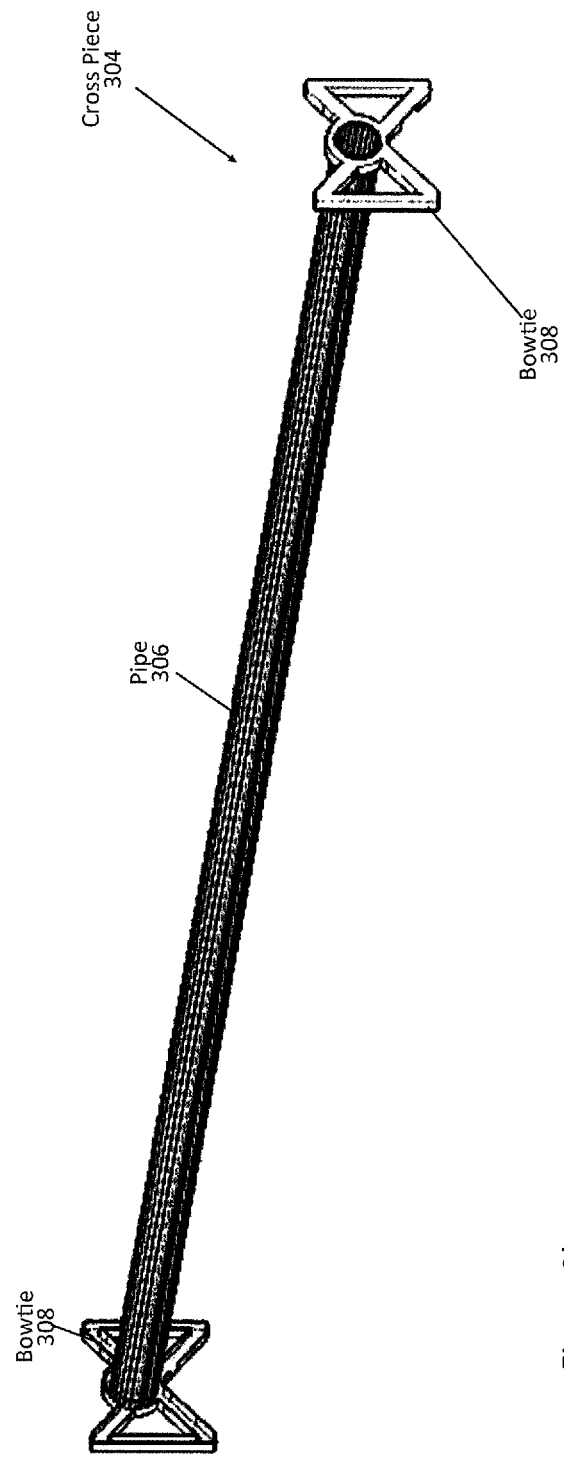
FIG. 3b is a perspective view illustrating an example of the cross piece isolated from lower bracket of the modular hydroponic tower array fixture system.

FIG. 3b provides a perspective view of the cross piece 304, isolated from the lower bracket 106. As shown in FIG. 3b, the cross piece 304 typically consists of a section of pipe 306 substantially equal in length to the lower bracket 106, inserted through support pieces, called bowties 308 that hold the pipe 306 up off of the bottom of the lower bracket 106 at a specific height, where an example elevated height may be three inches. The cross piece 304 may be made of metal such as aluminum or steel as well as plastic or wood and allows each hydroponic tower 102 to rest on the pipe 306 and hold securely on the cross piece 304, when the hydroponic tower 102 is inserted into a corresponding lower bracket opening 302 in the lower bracket 106. This allows each hydroponic tower 102 to remain elevated above the bottom of the lower bracket 106, allowing water and nutrients to easily drain out of each hydroponic tower 102 and into the lower bracket 106 where the water or nutrient solution is able to travel and drain into the reservoir 108.

Figure 4:
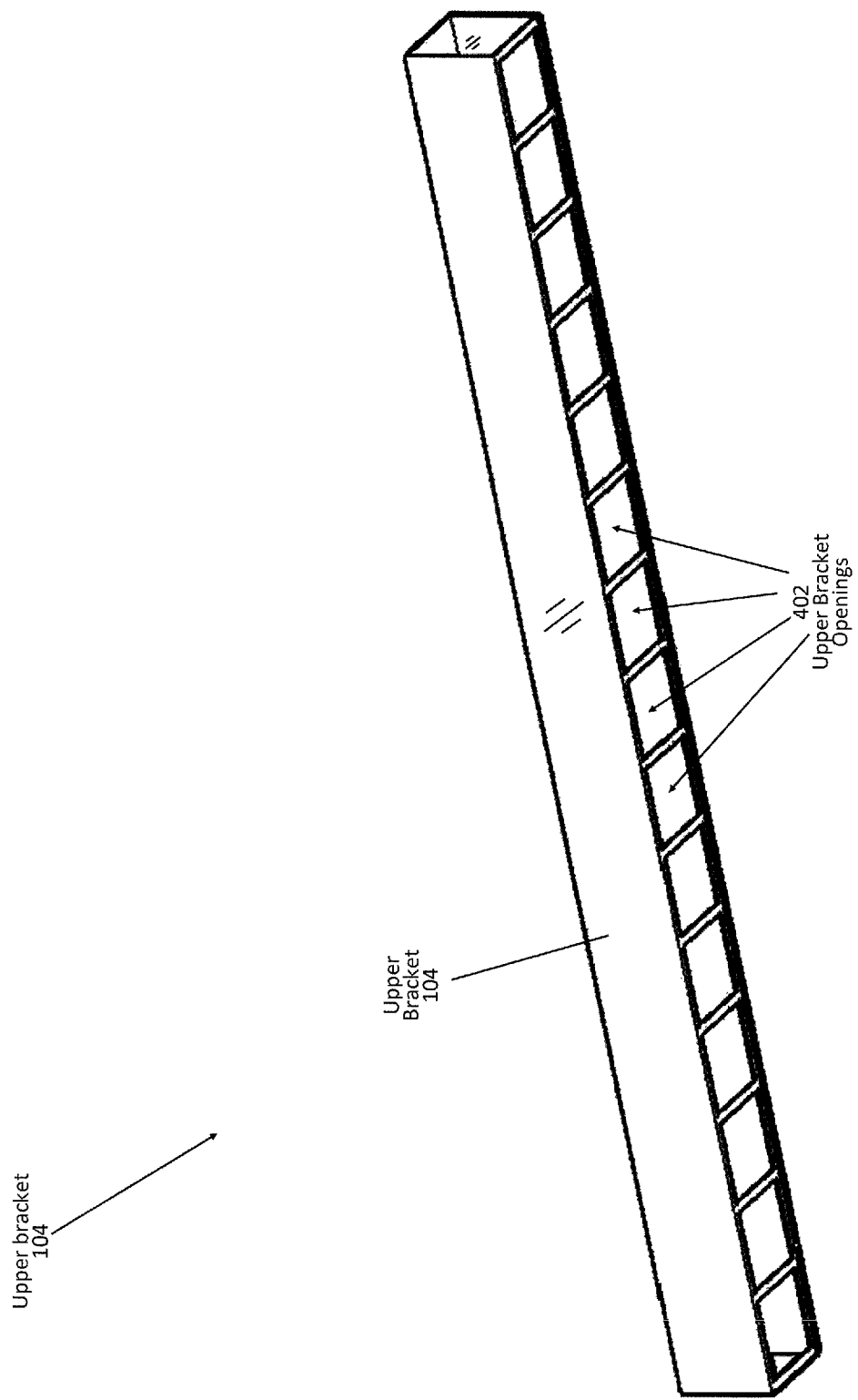
FIG. 4 is a perspective view illustrating an example of the upper bracket of the modular hydroponic tower array fixture system.

FIG. 4 provides a perspective view of the upper bracket 104 as isolated from the hydroponic tower array system. As previously discussed in relation to FIG. 1 and shown in FIG. 4, the upper bracket 104 is an elongated hollow structure with upper bracket openings 402 cut along the lower surface of the upper bracket 104, of the same shape and slightly larger than the cross section dimensions of the hydroponic tower 102 where the shape may include but is not limited to, substantially square, rectangular, round, oval, octagon, pentagon and triangular.

Figure 5:
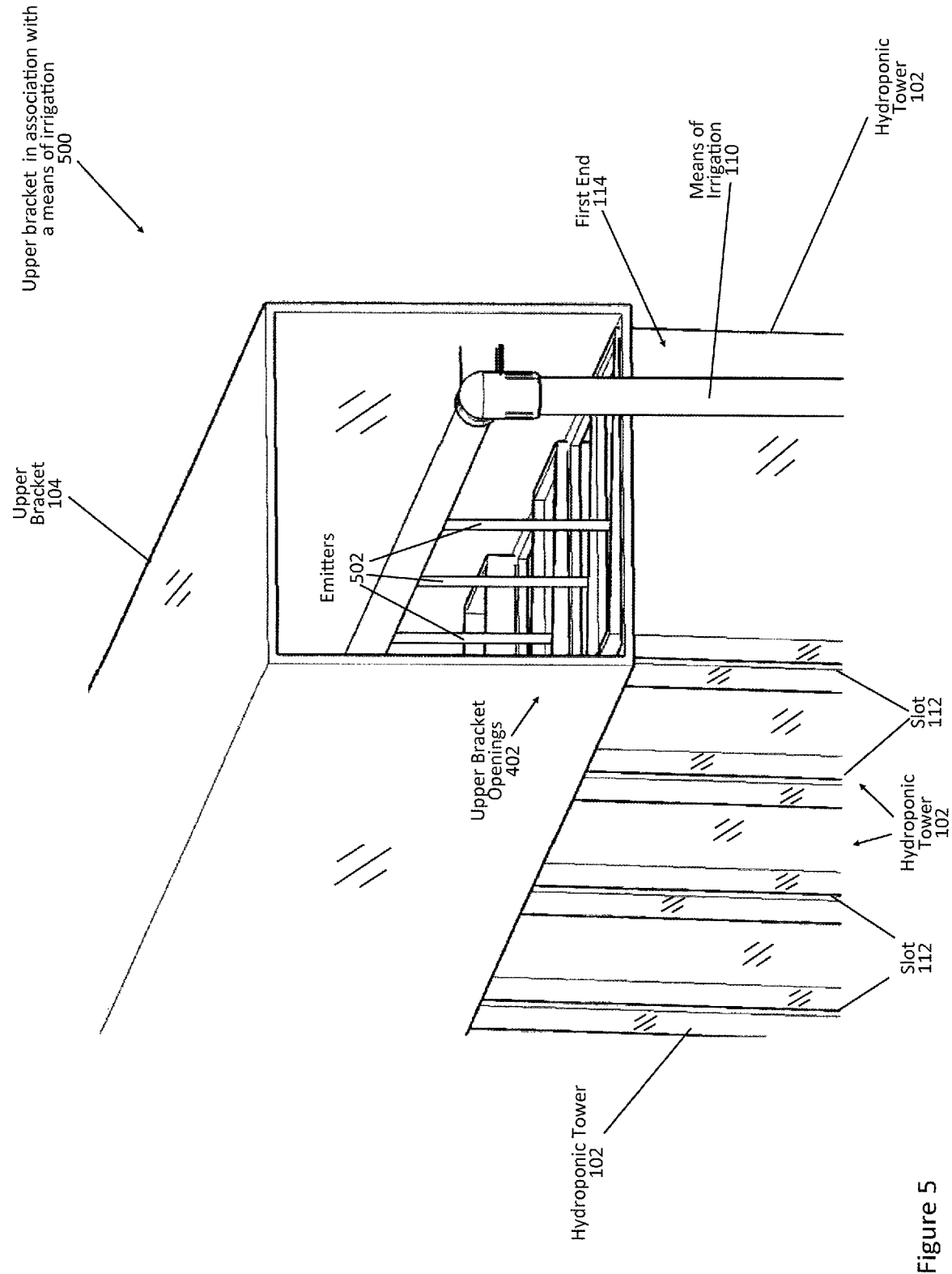
FIG. 5 is a close-up view illustrating an example of the upper bracket in association with a means of irrigation.

FIG. 5 provides a close-up view illustrating an example of the upper bracket 104 in association with a means of irrigation, 500. As shown in FIG. 5, a means of irrigation 110, which is capable of transporting and delivering water and nutrient solutions, is run from the reservoir 108 to the top of the first end 114 of the hydroponic towers 102. The means of irrigation 110 may be operably coupled, such as by a hangers or clips (not shown in FIG. 5) to the upper bracket 104 allowing the means of irrigation 110 to remain elevated above the first end 114 of the hydroponic towers 102. Water or nutrients are pumped through the means of irrigation 110 from the reservoir 108 to the top of the hydroponic towers 102. The water or nutrient solution may then be emitted from the means of irrigation 110 by a variety of emitters 502, including drip emitters, sprinklers and micro-spray emitters through the upper bracket openings 402 in the bottom of the upper bracket 104 into media material inserted in the grow chamber 202. The water and nutrient solution is then allowed to drip down through the media and the roots of the plants growing in the media.

Figure 6:
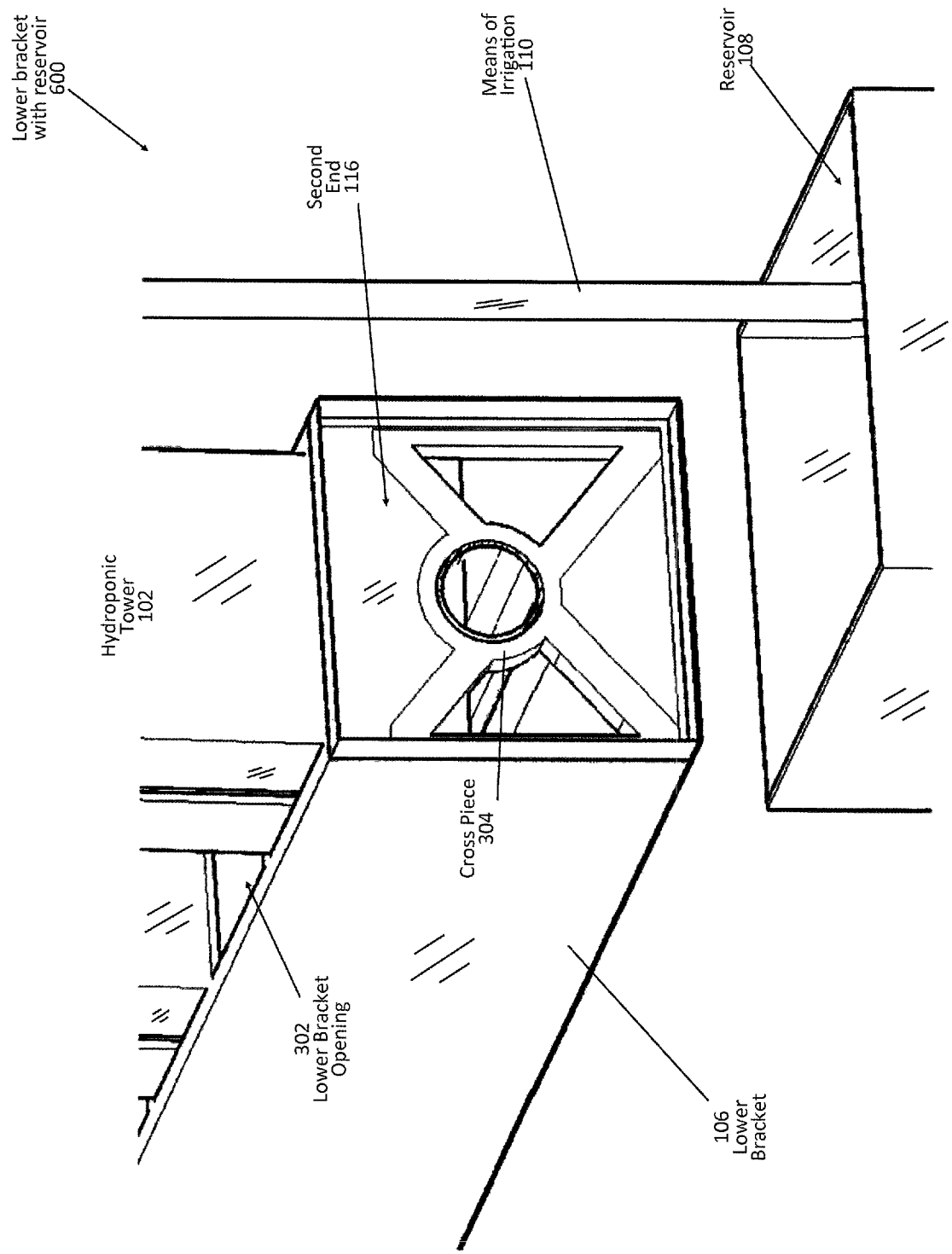
FIG. 6 is a close-up view illustrating an example of the lower bracket in association with a reservoir.

FIG. 6 provides a close-up view illustrating an example of the lower bracket in association with a reservoir 600. As shown in FIG. 6, the second end 116 of each hydroponic tower 102 is placed in the lower bracket opening 302 located in the top portion of the lower bracket 106. Each hydroponic tower 102 rests on the cross piece 304 running the length of the lower bracket 106, allowing each hydroponic tower 102 to be held securely on the cross piece 304.

As further shown in FIG. 6, each hydroponic tower 102 remains elevated above the bottom of the lower bracket 106, allowing water and nutrients to easily drain out of each hydroponic tower 102 and into the lower bracket 106 where the water or nutrient solution is able to travel and drain into the reservoir 108.

Figure 7:
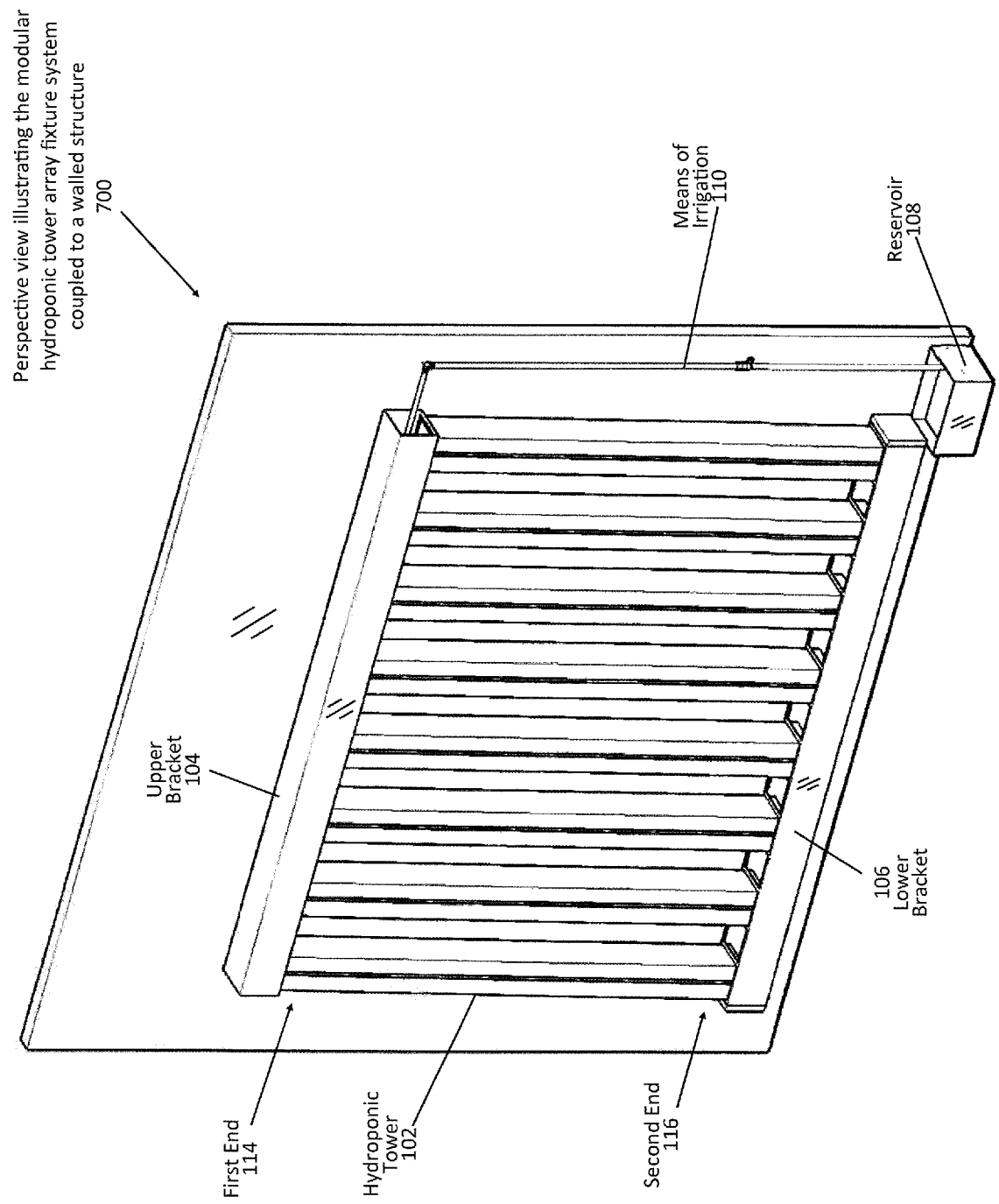
FIG. 7 is a perspective view illustrating an example of the modular hydroponic tower array fixture system coupled to a walled structure.

FIG. 7 is a perspective view illustrating an example of the modular hydroponic tower array fixture system coupled to a walled structure, 700. As shown in FIG. 7, in an embodiment the hydroponic tower array fixture system described herein may be mounted or coupled to a walled structure. In this embodiment the lower bracket 106 is operably coupled to the wall of a structure such as an internal wall or an external wall. A variety of methods are available to operably couple the lower bracket 106 to the wall, which are known in the art, including but not limited to, operably coupling each lower bracket 106 to the outer wall by bolting the lower bracket 106 to the wall. The upper bracket 104 may then be operably coupled to the wall or supported against the wall using the same or similar methods that were used to operably couple the lower bracket 106 to the wall.

Additional methods for attaching or mounting the system to a structure may include but is not limited to, pins that snapped into place on the structure, clips, including z-clips, and architectural anchors as well as various forms of adhesives depending on the building code and the expected use.

Each hydroponic tower 102 is then inserted into the system by inserting the first end 114 of the first hydroponic tower 102 into the opening in the upper bracket 104. The second end 116 of the hydroponic tower 102 is then swung inward and placed in the corresponding opening in the lower bracket 106. The bottom of the hydroponic tower 102 comes to rest and is situated on the cross piece running the length of the lower bracket 106.

To remove an individual hydroponic tower 102, the second end 116 of the hydroponic tower 102 is lifted vertically until the second end 116 is clear of the lower bracket 106. The second end 116 of the hydroponic tower 102 is then swung outward and lowered, allowing the first end 114 of the hydroponic tower 102 to drop out of and release from the upper bracket 104. In this way, individual hydroponic towers 102 can be quickly and easily placed in the modular hydroponic array system 100 and removed from the system 100.

The system described herein may also be supported by a variety of other means without the need of coupling the system to a walled structure. These may include various types of stands and braces, which will be understood by one skilled in the art.

Figure 8:
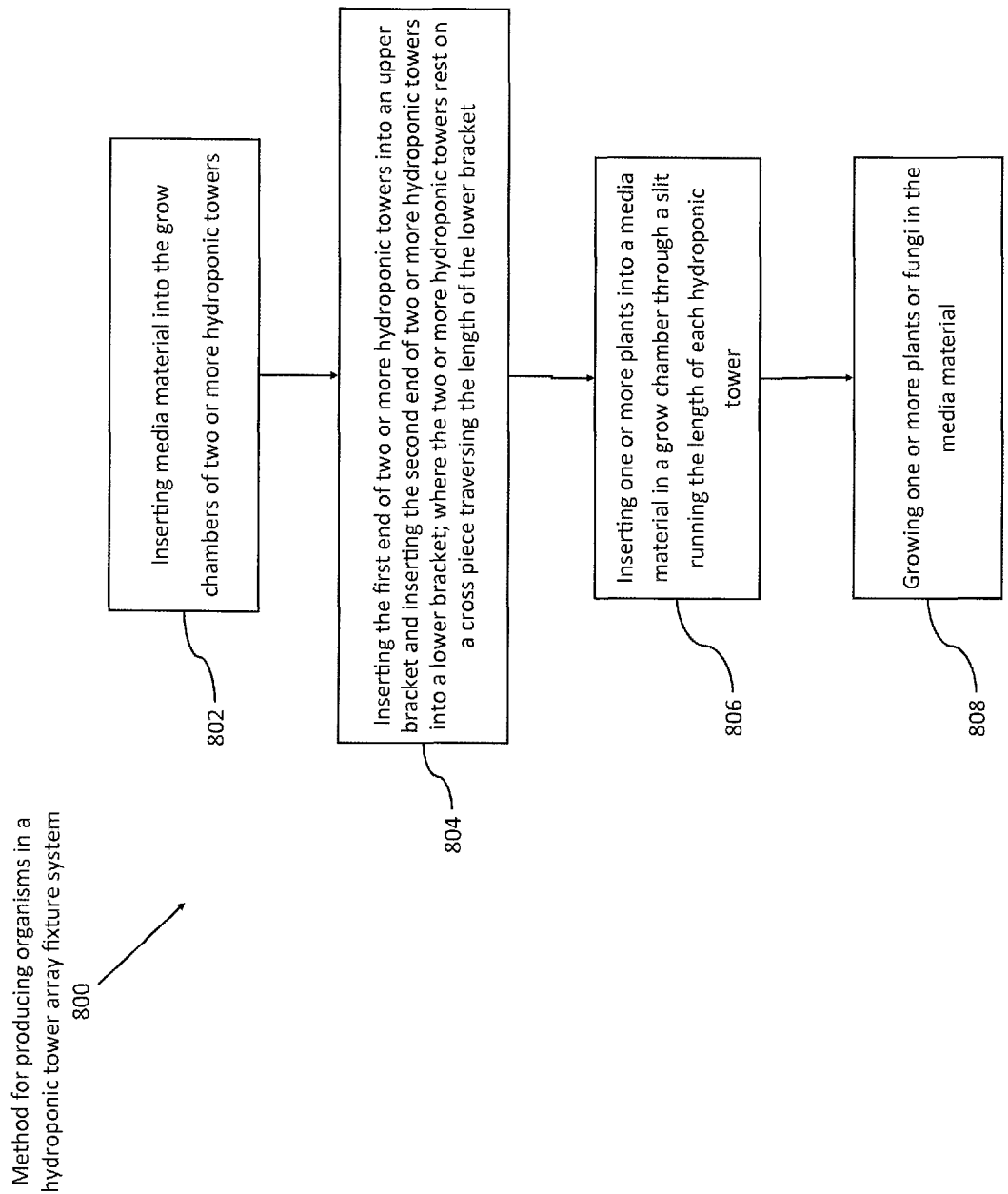
FIG. 8 provides a flow diagram for producing organisms on a modular hydroponic tower array fixture system.

FIG. 8 provides a flow diagram for producing organisms in a hydroponic tower array fixture system 800. In step 802, a single piece or strips of media material is placed or inserted into the hollow grow chamber of each hydroponic tower, where the hydroponic tower is comprised of a surface with a slot running the length of the surface, with an open first end and an open second end. In step 804, the open first end of the hydroponic tower is inserted into an upper bracket with openings in the bottom surface of the upper bracket substantially corresponding to the diameter and shape of each hydroponic tower. The second end of each hydroponic tower is then inserted into a lower bracket, which also has openings cut into the top surface of the upper bracket substantially corresponding to the width and shape of each hydroponic tower. Each hydroponic tower rests and is secured on top of a cross piece internally running the length of the lower bracket. In step 806, one or more plants or fungi are inserted into the media material, through the slot running the length of the front surface of each hydroponic tower. In step 808, the plants or fungi in the media material are then grown and may be harvested as desired. Water and nutrients may be pumped to the top of each hydroponic tower and emitted into the media material and allowed to drip down through the media where the plants may update the nutrients as needed. Any remaining nutrients may then be collected in the lower bracket and then drained into a reservoir located at the base of the hydroponic tower array fixture system, where the nutrients may then be recycled back to the plants or fungi.

The hydroponic tower array fixture system offers the ability for users to quickly remove a single hydroponic tower from the system as needed, such a removing mature plants for harvesting or removing dead plants while also allowing the user to quickly and easily identify, isolate and remove pests or disease from the system without damaging other plants located in other hydroponic towers The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A hydroponic tower array fixture system comprising:
   two or more hollow hydroponic towers, wherein said two or more hollow hydroponic towers have a horizontal cross section shape, a front surface, an open first end, and an open second end;
   a slot formed in the front surface of each of said two or more hydroponic towers, the slot running continuously along the front surface and having a width equal to only a portion of a width of the front surface; and
   a media material insertable into each hollow hydroponic tower;
   an upper bracket having a bottom surface, wherein at least two upper bracket openings are formed in the bottom surface of the upper bracket substantially corresponding to the horizontal cross section shape and width of the two or more hydroponic towers; and
   a hollow lower bracket having an interior chamber and a top surface, wherein at least two lower bracket openings are formed in the top surface of the lower bracket substantially corresponding to the horizontal cross section shape and width of the two or more hydroponic towers;
   wherein the first end of at least one of the two or more hollow hydroponic towers is inserted into one of the at least two upper bracket openings of the upper bracket;
   a cross piece, wherein the cross piece comprises a pipe and at least two support pieces, where the at least two support pieces support the pipe, and wherein said cross piece traverses the length of the interior chamber of the hollow lower bracket; and
   wherein said cross piece elevates said hydroponic tower from the interior chamber of the lower surface of the lower bracket; and
   wherein the second end of the hollow hydroponic tower is inserted into one of the at least two lower bracket openings of the lower bracket.

2. The system of claim 1, further comprising:
   a reservoir; and
   a conduit capable of transporting water or liquid nutrients from the reservoir.

3. The system of claim 2, further comprising a system of irrigation, wherein said system comprises:
   at least one pump;
      wherein said conduit is operably coupled to said at least one pump; and
   at least one emitter;
      wherein said pump transports water or liquid nutrients from said reservoir through the conduit and delivered to said media material through said at least one emitter.

4. The system of claim 3, wherein said emitter is selected from a drip emitter, sprinkler and micro-spray emitters.

5. The system of claim 1, wherein said lower bracket is operably coupled to a structure.

6. The system of claim 5, wherein said upper bracket is operably coupled to a structure.

7. The system of claim 1, wherein said media material is made of plastic.

8. The system of claim 7, wherein said media material is made from a polyethylene plastic.

9. The system of claim 8, wherein said media material is coated in a silicone binder.

10. The system of claim 1, wherein said system is capable of growing organisms on said media material and through said slot formed in the front surface of each of said two or more hydroponic towers, wherein said organisms are selected from plants and fungi.

11. The system of claim 1, wherein the horizontal cross sectional shape of the hydroponic tower is chosen from square, rectangular, round, oval, octagon, pentagon and triangular.

12. The system of claim 1, wherein said media material is chosen from: granular media, Styrofoam, polyurethane foam, plastic mesh, rock wool, coconut fiber, wicking strips, cultivation bags and vermiculite.

13. A method for producing organisms on a hydroponic tower array fixture system, the method comprising:
  providing two or more hollow hydroponic towers with a front surface, wherein said two or more hollow hydroponic towers have a horizontal cross section shape, a front, an open first end, and an open second end;
  providing a slot formed in the front surface of each of said two or more hydroponic towers, the slot running continuously along the front surface and having a width equal to only a portion of a width of the front surface; and
  providing a media material;
  inserting said media material into each hollow hydroponic tower;
  providing an upper bracket, wherein at least two upper bracket openings are formed in the bottom surface of the upper bracket substantially corresponding to the horizontal cross section shape and width of the two or more hydroponic towers; and
  providing a hollow lower bracket having an interior chamber, wherein at least two lower bracket openings are formed in the top surface of the lower bracket substantially corresponding to the horizontal cross section shape and width of the two or more hydroponic towers;
  providing a cross piece, wherein the cross piece is inserted into and traverses the length of the interior chamber of the lower bracket, wherein the cross piece comprises a pipe and at least two support pieces, where the at least two support pieces support the pipe; and
  inserting the open first end of at least one of the two or more hollow hydroponic towers into one of the at least two upper bracket openings of the upper bracket; and
  inserting the open second end of the hollow hydroponic tower into one of the at least two lower bracket openings of the lower bracket, wherein the second end of the hollow hydroponic tower rests on said cross piece and wherein said cross piece elevates said hydroponic tower from the lower surface of the interior chamber of the lower bracket;
  inserting one or more organisms into the medial material through the slot formed in the front surface of each hydroponic tower; and
  growing one or more organisms on said media material.

14. The method of claim 13, further comprising:
  providing a reservoir; and
  providing a conduit capable of transporting water or liquid nutrients from the reservoir.

15. The method of claim 13, further comprising a system of irrigation, wherein said system wherein comprises:
  providing at least one pump;
  providing a conduit capable of transporting water or liquid nutrients from said reservoir, wherein said conduit is operably coupled to said at least one pump; and
  providing at least one emitter;
  wherein said pump transports water or liquid nutrients from said reservoir through the conduit and delivered to said media material through said at least one emitter.

16. The method of claim 15, wherein said emitter is selected from a drip emitter, sprinkler and micro-spray emitters.

17. The method of claim 13, wherein said lower bracket is operably coupled to a structure.

18. The method of claim 13, wherein said upper bracket is operably coupled to a structure.

19. The method of claim 13, wherein said media material is made of plastic.

20. The method of claim 19, wherein said media material is made from a polyethylene plastic.

21. The method of claim 20, wherein said media material is coated in a silicone binder.

22. The method of claim 13, wherein said organisms are selected from plants and fungi.

23. The method of claim 13, wherein the horizontal cross sectional shape of the hydroponic tower is chosen from square, rectangular, round, oval, octagon, pentagon and triangular.

24. The method of claim 13, wherein said media material is chosen from: granular media, Styrofoam, polyurethane foam, plastic mesh, rock wool, coconut fiber, wicking strips, cultivation bags and vermiculite.

25. The method of claim 13, further comprising removing at least one said hydroponic tower from said hydroponic tower array fixture system, said method comprising:
  lifting vertically said second end of said hydroponic tower from said lower bracket;
  swinging said hydroponic tower outward; and
  lowering said hydroponic tower to drop out of and release from said upper bracket.

\* \* \* \* \*